B. W. BEERY.
PISTON HEAD.
APPLICATION FILED SEPT. 28, 1916.
1,219,223.
Patented Mar. 13, 1917.
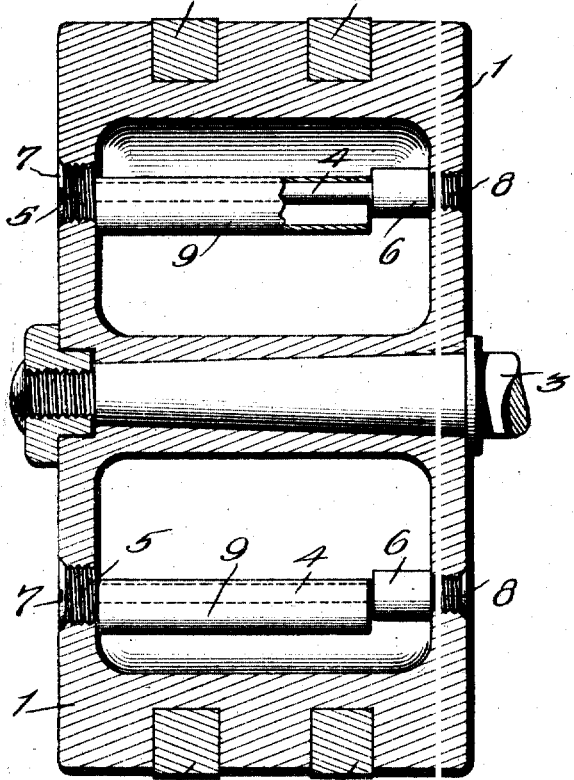
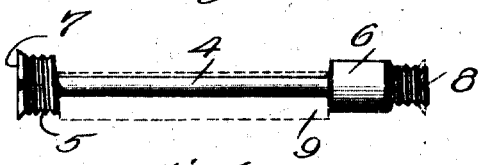
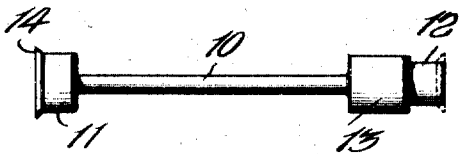
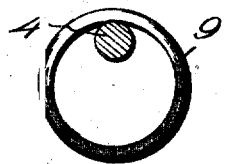
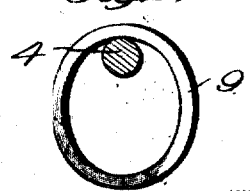
WITNESSES
INVENTOR
BERNARD W. BEERY,
BY
ATTORNEYS

UNITED STATES PATENT OFFICE.

BERNARD WILLIAM BEERY, OF PORTSMOUTH, OHIO.

PISTON-HEAD.

1,219,223.   Specification of Letters Patent.   Patented Mar. 13, 1917.

Application filed September 28, 1916. Serial No. 122,610.

*To all whom it may concern:*

Be it known that I, BERNARD W. BEERY, a citizen of the United States, and a resident of Portsmouth, in the county of Scioto and State of Ohio, have invented a certain new and useful Improvement in Piston-Heads, of which the following is a specification.

My invention is an improvement in piston heads, and has for its object to provide a mechanism in connection with the plugs of piston heads, for preventing the accidental dislodgment of the plugs when they are once in place.

In the drawings:

Figure 1 is a longitudinal vertical section of a piston head provided with my improved plugs;

Fig. 2 is a plan view of one of the plugs detached;

Fig. 3 is a similar view of another form of plug;

Fig. 4 is a section through the plug with the holder in place; and

Fig. 5 is a similar view showing the deformation of the holder which prevents displacement thereof and of the plug.

The present embodiment of the invention is shown in connection with a piston head 1 having the usual rings 2 and connected with the piston rod 3 in the usual manner. The plugs indicated generally at 4 have their ends enlarged as shown at 5 and 6 respectively, and in the construction in Fig. 2, the end 5 is threaded and has a flaring or frusto conical outer end 7. The enlargement 6 is plain, and beyond the enlargement the plug has a reduced threaded portion 8.

The plugs are inserted in the openings of the piston head 1 from the end of the head remote from the rod 3; the reduced end 8 being first inserted into the head. The opening at the outer end of the head for receiving the enlargement 5 is of such size that the enlargement 6 may pass through the said opening and the threads of the enlargement 5 and the reduced threaded portion 8 are of the same pitch so that the plug may be turned into place. The flaring or tapered portion 7 of the plug fits the reamed outer end of the opening for the enlargement 5, and after the plug is in place, the end of the reduced portion 8 is upset or headed, as indicated in dotted lines in Fig. 2 and shown in Fig. 1, to prevent dislodgment of the plug.

The improvement consists in placing upon the plug a section 9 of pipe of a diameter to fit smoothly over the enlargement 6 of the plug, and of a length to extend from the inner end of the enlargement 5 to the inner end of the enlargement 6, as indicated in dotted lines in Fig. 2. This pipe will drop down, as shown in Fig. 1 after the plug is inserted.

The pipe is of such external diameter that it may enter the opening for the enlargement 5, and it will be obvious that when the pipe is in place on the plug, it will occupy the position shown in Fig. 1 and indicated in dotted lines in Fig. 2. The pipe is now deformed by pressure, taking an oblong form in cross section, as shown in Fig. 5. The pipe is now locked in place between the enlargements 5 and 6, because the short axis of the cross section of the pipe will not pass over the enlargement 6. When the plug is placed in the head in the manner shown in Figs. 1 and 2, the pipe will drop down into position between the enlargements 5 and 6 and will positively prevent displacement of the plug. Should the plug, for any reason, become loosened, the end of the pipe adjacent to the enlargement 5 will engage the piston head and will hold the plug in place. At the opposite end, the enlargement 6 prevents movement of the pipe toward the reduced portion 8.

In Fig. 3 is shown a modified form of plug 10 wherein the enlarged portion 11 and the reduced portion 12 beyond the enlarged portion 13 are plain, and the plug is held in place by a flaring rib or flange 14 and the upsetting of the end of the reduced portion 12. The pipe or holder acts in the same manner with this plug as the plug shown in Fig. 2.

I claim:—

1. In combination with the piston head and the plugs therefor, of means seated on each plug for preventing longitudinal movement thereof with respect to the head when the plug has been inserted, said means comprising a cylindrical casing of a diameter to enter the opening for the plug at the outer end of the head, and of a length to fit between the enlargements at the ends of the plug, and of an internal diameter to fit over the enlargement at the inner end of the plug and afterward deformed to prevent a return movement over the said plug.

2. The combination with the piston head and the plugs thereof, of means in connection with each plug for preventing longitudinal movement thereof with respect to the head after the plug has been inserted, said means comprising counterbores at the outer ends of the openings for the plugs, the large end of the plug having a beveled marginal rib fitting the counterbore at the said end, and the other end of the plug being upset to fill the counterbore.

3. In combination with the piston head and the plugs thereof, of means in connection with each plug and within the head for preventing longitudinal movement thereof with respect to the head after the plug has been inserted.

4. In combination with the piston head and the plugs therefor, of means seated on each plug and within the head for preventing longitudinal movement thereof with respect to the head when the plug has been inserted.

5. In combination with the piston head and the plugs thereof, of means in connection with each plug for preventing longitudinal movement thereof, the said means comprising a shell or casing loosely engaging the plug within the head.

BERNARD WILLIAM BEERY.